June 18, 1940.
J. C. McCUNE ET AL
2,204,807
BRAKE MECHANISM
Filed Jan. 31, 1939
3 Sheets-Sheet 1
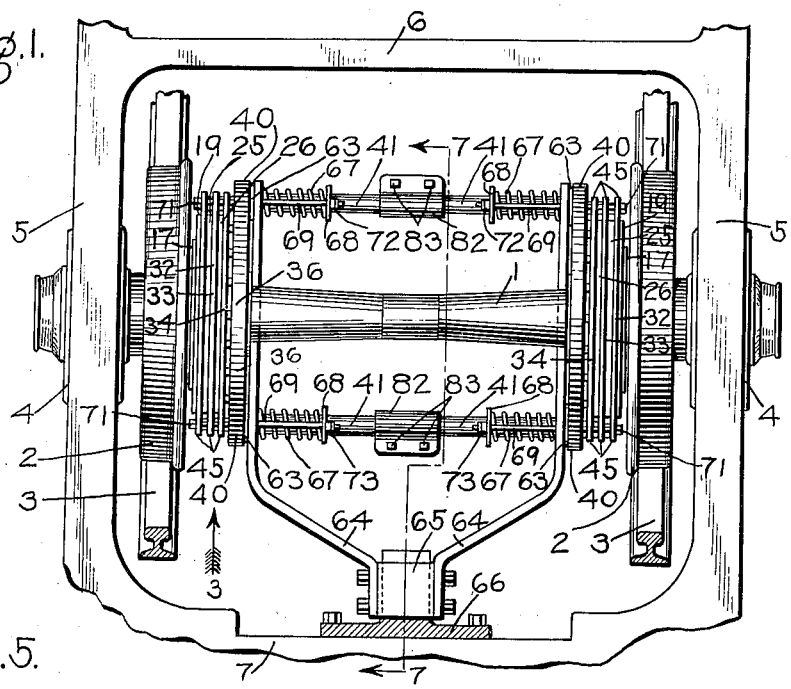
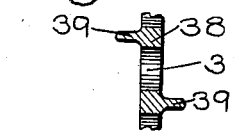
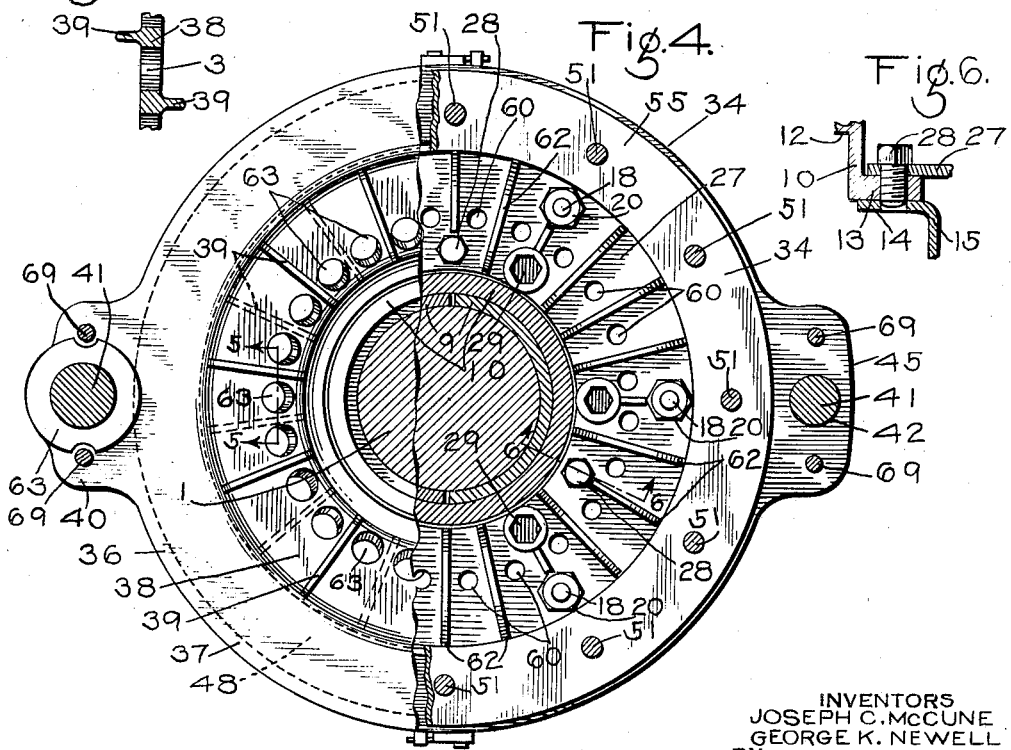
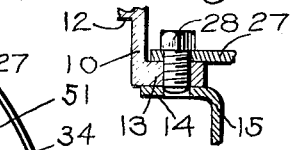
INVENTORS
JOSEPH C. McCUNE
GEORGE K. NEWELL
BY
ATTORNEY

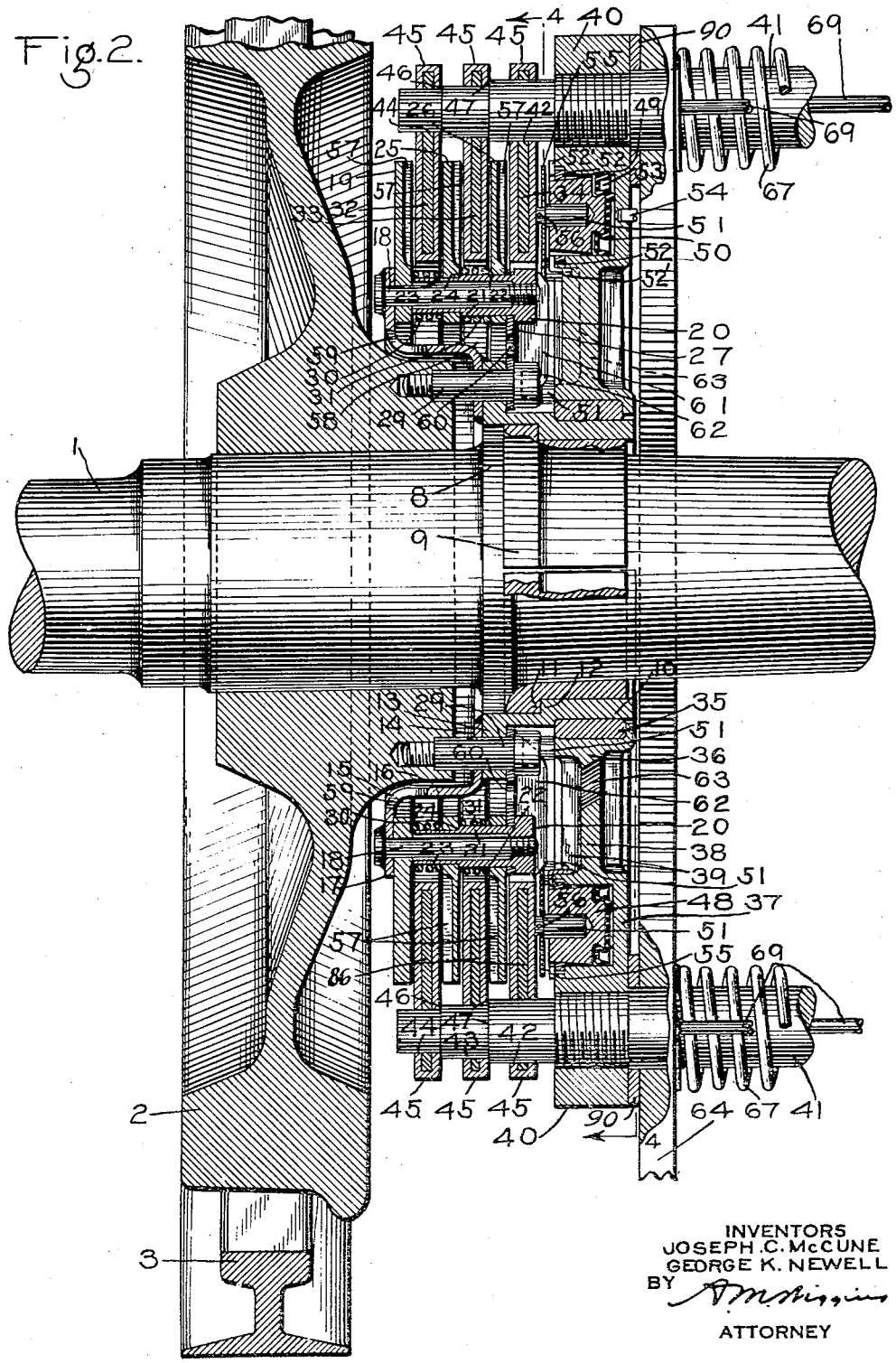

June 18, 1940.  J. C. McCUNE ET AL  2,204,807
BRAKE MECHANISM
Filed Jan. 31, 1939  3 Sheets-Sheet 3
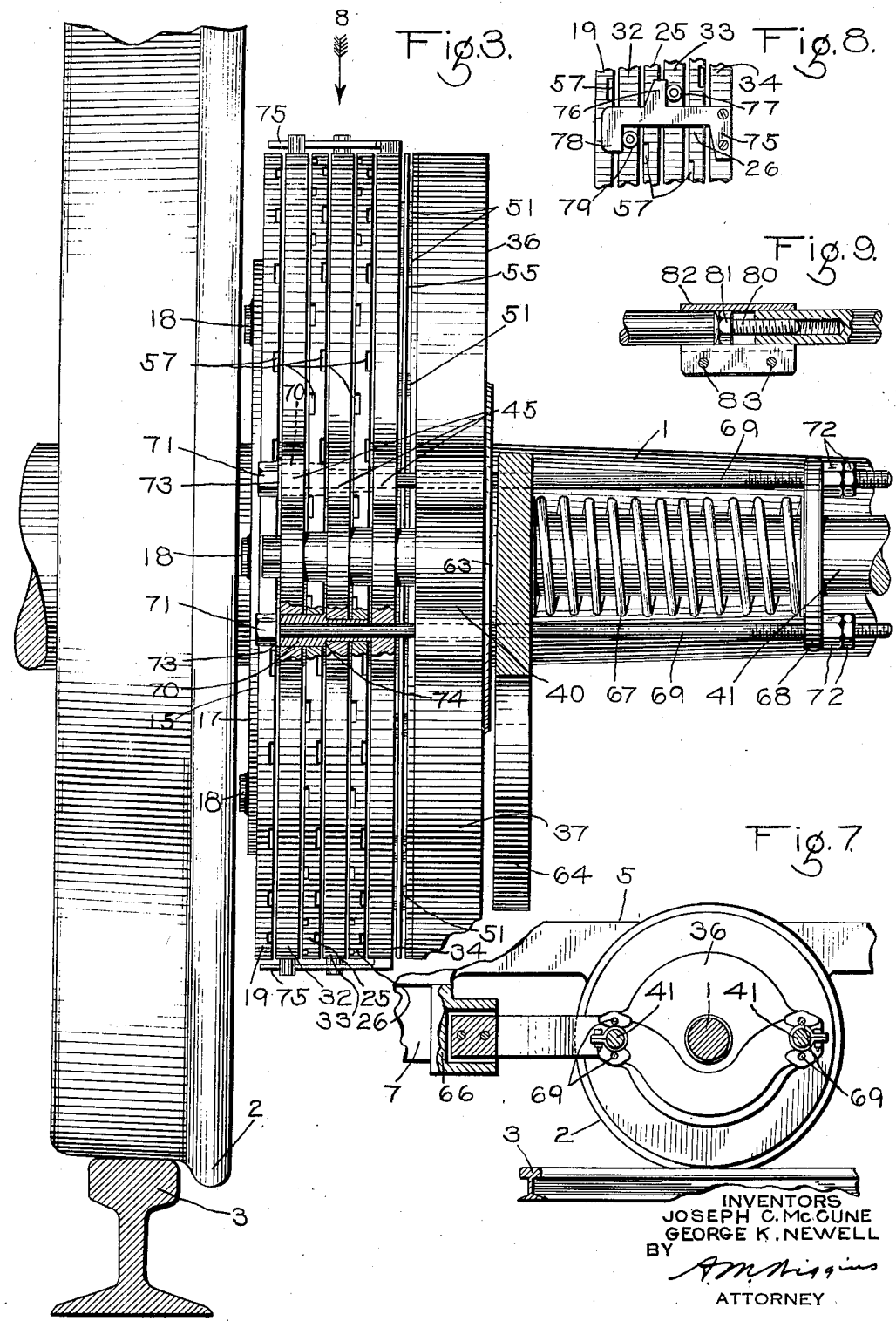
INVENTORS
JOSEPH C. McCUNE
GEORGE K. NEWELL
BY
A. M. Higgins
ATTORNEY Patented June 18, 1940

2,204,807

UNITED STATES PATENT OFFICE 2,204,807

BRAKE MECHANISM

Joseph C. McCune, Edgewood, and George K. Newell, near Pitcairn, Pa., assignors to The Westinghouse Air Brake Company, Wilmerding, Pa., a corporation of Pennsylvania Application January 31, 1939, Serial No. 253,770

31 Claims. (Cl. 188—153)

This invention relates to vehicle brakes and more particularly to disc type brakes for use on trucks of railway vehicles.

The present tendency toward increasing the speed of railway trains has resulted in stream lining thereof and in reducing the center of gravity of the vehicles in order to increase their stability on the track. Due to these changes, parts of certain vehicles have been dropped so low as to just clear the axles on the vehicle trucks, and as a result the space between these parts and the truck wheels is also minimized since a certain amount of this space must be open to accommodate said parts when the trucks turn relative to the truck body upon rounding curves.

From the above it will readily be apparent that spaces heretofore existing on railway vehicles for the installation of brakes and the control mechanism are now substantially filled by other parts of the vehicle. A major problem is therefore presented in the design and installation of an adequate and efficiently operating brake system for these modern vehicles.

The problem is further complicated in that these modern high speed vehicles require brakes which are more powerful and faster acting, and which provide for more accurate and flexible control of the vehicles, than ever before provided, in order to secure the desired safe operation of the train and the comfort of the passengers at all times.

Still further, a brake system installed in the limited spaces available must be readily accessible for inspection and certain maintenance and must be adequately cooled to provide efficient braking. Heretofore cooling of the brake elements has been accomplished largely by the natural flow of air currents under and around the vehicles incident to movement thereof, but such natural air currents are so reduced in modern vehicles, due to the stream lining and the low position of the bodies thereof, as to prevent obtaining adequate cooling of the braking elements.

One object of the present invention is therefore to provide an improved, disc type of brake mechanism particularly adapted though not limited for use on modern vehicles of the type above described.

Another object of the invention is to provide an improved disc type brake mechanism which is adapted to be installed in the very limited space available inside of and adjacent to the wheels of such vehicles.

Another object of the invention is to provide for each wheel of a railway vehicle truck an improved disc brake mechanism, including a direct acting brake cylinder therefor, which is adapted to be installed in the very limited space available inside of and adjacent to the wheels of these modern vehicles.

Another object of the invention is to provide an improved direct acting brake mechanism such as just described having improved means for cooling the braking elements of the mechanism and for preventing the transfer of heat from said elements to the intimately associated direct acting brake cylinder device so as to avoid damaging said brake cylinder device or destroying the piston lubricant therein.

Another object is to provide an improved annular or ring like brake cylinder piston particularly adapted for use in brake mechanisms such as above described and so designed as to avoid binding thereof in the brake cylinder bore.

Another object of the invention is to provide in a brake mechanism such as above described improved means for releasing the various operating elements thereof and for defining their release positions.

Another object of the invention is to provide an improved disc brake mechanism in which the majority of the parts may be preassembled for application as a unit to a wheel and axle assembly of a vehicle truck.

Other objects and advantages will be apparent from the following more detailed description of the invention.

In the accompanying drawings; Fig. 1 is a plan view of a portion of a railway vehicle truck showing the improved brake mechanism, also in plan, associated therewith; Fig. 2 is a sectional view, taken horizontally through the brake mechanism shown adjacent one of the truck wheels in Fig. 1; Fig. 3 is a side view of the brake mechanism shown in Fig. 2 taken in the direction of the arrow 3 in Fig. 1; Fig. 4 is a sectional view taken substantially on the line 4—4 in Fig. 2; Figs. 5 and 6 are sectional views taken on the lines 5—5 and 6—6 in Fig. 4; Fig. 7 is a sectional view taken on the line 7—7 in Fig. 1; Fig. 8 is a view taken in the direction of arrow 8 in Fig. 3; and Fig. 9 is a sectional view taken through certain elements shown in Fig. 1.

General description

As shown in the drawings, the vehicle truck with which the improved disc mechanism is associated, for the purpose of illustration, comprises the assemblage of an axle 1 and wheels 2 secured to rotate with said axle in any desired manner and in the usual spaced relation for rolling on track rails 3. A journal box 4 is mounted on the axle 1 outboard of each of the wheels 2 and carries a truck frame which comprises side members 5 mounted on and supported by said journal boxes, and the usual, transversely extending end member 6 and transom 7 connecting said side frames together.

Only one end of a truck is shown in the drawings since the brake mechanism embodying the invention and adapted to be applied to the wheel and axle assemblies at both ends of the truck are of identical construction, and the showing therefore is deemed adequate to a comprehensive understanding of the invention.

Description of disc brake mechanism

A disc brake mechanism embodying the invention is adapted to be associated with each of the wheels of a wheel and axle assembly of a railway vehicle truck. Both of these brake mechanisms are of identical construction, but the one associated with one of the wheels of the wheel and axle assembly is adapted to be disposed opposite to that associated with the other wheel. One of these disc brake mechanisms will now be described in detail.

The axle 1 is provided adjacent each of the wheels 2 with an annular collar 8 and said axle is tapered inwardly from said collar toward the middle of the axle between the wheel 2. A split sleeve 9 is secured on this tapered portion of the axle and engages the collar 8, the inner surface of said sleeve being shaped to fit the taper on axle 1 while the outer surface of said sleeve is of cylindrical form.

An annular support ring 10 is slidably mounted on the exterior surface of the split sleeve 9 and is provided with an annular step like shoulder 12 which engages an oppositely disposed shoulder 11 adjacent the inner end of the split sleeve 9 for forcing the split sleeve against the collar 8 on axle 1, as will be later described.

The support ring 10 is provided at the end adjacent wheel 2 with an outwardly extending radial flange 13 to the outer face of which is rigidly secured, preferably by welding, an inwardly extending radial flange 14 of a torque ring 15 which encircles the axle 1. The torque ring 15 comprises a central cylindrical portion 16 having the flange 14 at the end most remote from wheel 1 and having at the opposite end an out turned radial flange 17. The flange 17 is provided with a plurality of preferably, equally spaced bores through each of which projects in a direction away from the wheel 1, a torque bolt 18, the head of each of said bolts being disposed between said flange and the wheel 1 and being welded to said flange for rigidly securing said bolts in the positions shown in the drawings.

An annular, rotatable friction braking element 19 encircling the torque 15 is provided with bores through which the torque bolts 18 extend and is mounted on said bolts against the radial flange 17. A nut 20 is provided on each of the bolts 18 having screw-threaded engagement with the ends of the bolts, and each of said nuts has a sleeve-like extension 21 encircling the bolt and bearing at its end against the rotatable braking element 19 for rigidly holding same against the radial flange 17 against movement.

The sleeve-like extension 21 comprises two integrally formed cylindrical guides 22 and 23 of different diameters, the guide 22 of greater diameter being provided adjacent the nut 20, and a stop shoulder 24 being provided at the junction of said two guides.

An annular rotatable friction braking element 25 disposed in coaxial relation to the braking element 19 is slidably mounted on the several guides 23, being provided with bores through which said guides extend, while an annular rotatable friction braking element 26 having bores through which the guides 22 extend is slidably mounted thereon in coaxial relation with the rotatable elements 19 and 25.

An annular plate 27 encircling the support ring 10 is rigidly secured against the radial flange 13 thereof by a plurality of assembling screws 28 extending through said plate and having screw-threaded engagement with said flange, and also by a plurality of torque screws 29 extending through both said plate and flange and having screw-threaded engagement with the hub portion of the wheel 1. The torque bolts 18 and the guides 22 on the nut 20 extend through suitably spaced bores adjacent the outer edge of the plate 27 and said nuts engage said plate when screwed up until the guide 23 at the inner end thereof engages the rotatable braking element 19, the opposite face of said plate being engageable by the rotatable braking element 26.

A coil spring 30 is provided on each of the guides 23 acting on the rotatable braking elements 19 and 25 for urging the latter into engagement with the shoulder 24 which defines its release position, while a similar spring 31 is provided on each of the guides 22 acting on the rotatable braking elements 25 and 26 for moving the rotatable braking element 26 to its release position defined by engagement with the plate 27.

Interleaved and in coaxial alignment with the rotatable braking elements 19, 25 and 26 are three non-rotatable friction braking elements 32, 33 and 34, the element 32 being disposed between the rotatable elements 19 and 25; the element 33 being disposed between the rotatable elements 25 and 26, while the element 34 is disposed adjacent the opposite face of the rotatable element 26. These non-rotatable braking elements are supported and adapted to be operated by means to be later described.

The non-rotatable braking elements 32, 33 and 34 may be made of any desired material and in any desired manner but preferably each comprises a central ring portion 86 made of tough steel and completely embedded by casting, in cast iron to provide oppositely disposed friction faces having desired frictional characteristics.

A cylindrical, self-lubricating bearing 35 is mounted on the ring 10 adjacent the inner end thereof and journaled on this bearing is an annular, brake cylinder device 36 which comprises the central bearing portion, an annular ring-like cylinder portion 37 encircling said bearing portion in substantial axial alignment with the annular friction braking elements above described, and an intermediate web 38 and radial ribs 39 provided on the opposite sides of said web, said web and ribs supporting the cylinder portion 37. The ribs 39 on one side are preferably staggered with respect to those on the opposite side for increasing rigidity.

The brake cylinder device is provided at opposite sides outside the cylindrical portion 31 thereof with a pair of oppositely disposed radial extending ears 40 in each of which there is secured by screw-threaded engagement one end of a rod 41. On the wheel side of the brake cylinder device each of the rods 41 is provided with three cylindrical bearing portions 42, 43 and 44 of different diameters stepped down in the direction of the ends of the rods.

Each of the non-rotatable braking elements 32, 33 and 34 is provided with a pair of oppositely disposed radial extending ears 45 in alignment with those on the brake cylinder device. The ears 45 on the non-rotatable braking element 34 are provided with suitable bores to receive the bearing portions 42 of the rods 41 upon which said element is slidably mounted. In a like manner the non-rotatable element 33 is slidably mounted on the bearing portions 43 of the rods 41, while the non-rotatable braking element 32 is slidably mounted on the bearing portions 44 of the rods. The rods 41 thus act to support the non-rotatable braking elements in coaxial relation with the rotatable braking elements.

At the junctions of the bearing portions 42, 43 and 44 on rods 41, stop shoulders 46 and 47 are provided which are adapted to be engaged by the non-rotatable braking elements 32 and 33, respectively, for defining the release positions of said elements in which they are disengaged from the rotatable braking elements 19 and 25 when in their release positions above described.

The cylinder portion 37 of the brake cylinder device 36 is provided with an annular piston bore in axial alignment with the several annular braking elements. This bore is substantially U-shaped in cross-section, with the open side of the bore facing the annular braking elements, and slidably mounted in said bore is a brake cylinder piston 48.

The brake cylinder piston 48 comprises a pressure head 49 and a flexible packing cup 50 secured in any desired manner to the high pressure face thereof which is opposite the annular braking elements, while secured to said head and projecting from the opposite or low pressure face thereof are a plurality of equally spaced pressure pins 51 the outer ends of which engage the adjacent face of the non-rotatable braking element 34.

Both the inner and outer peripherial surfaces of the piston head 49 are preferably tapered toward each other from the end adjacent the packing cup 50 to the low pressure end in order to prevent said piston binding in its bore upon movement in the direction of the braking elements in case one side of said piston should start moving ahead of the opposite side.

An annular ring 52 made of felt or the like is secured by a metal ring 52' in the cylinder portion 37 of the brake cylinder device at each s'de of the piston head 49 adjacent the low pressure face thereof and has sliding contact with said piston for preventing the entrance of dirt around said piston and for also holding lubricant in the piston cylinder and for spreading same on the piston upon reciprocation thereof.

At the outer face of the packing cup 50 there is provided a pressure chamber 53 which is connected to a pipe 54 through which fluid under pressure is adapted to be supplied to and released from said chamber in any desired manner for effecting the reciprocation of the brake cylinder piston 48.

An annular relatively thin ring 55 of substantially the same width as the annular braking elements is interposed substantially midway between the non-rotatable braking element 34 and the adjacent end of the cylinder portion 37 of the brake cylinder device 36. The ring 55 is carried on the several pressure pins 51, the outer reduced ends of which extend through suitable apertures in the ring. A key 56 is provided through the end of each of the pins 51 to hold the ring 55 thereon.

The ring 55 is preferably provided with a highly polished surface at least on the face adjacent the brake elements, and is also made of a material such as copper or an alloy thereof which is adapted to rapidly dissipate heat A plurality of radial slots 57 are provided across the inside face of the rotatable brake element 19 and across both of the opposite faces of the rotatable braking elements 25 and 26, the slots in one face of the braking elements 25 and 26 being staggered with respect to those in the opposite face.

The slots 57 extend past the inner peripheral faces of the non-rotatable braking elements 32, 33 and 34 and open to a chamber 58 provided between the torque ring 15 and annular plate 27. The opposite ends of the slots 57 open through the outer peripheral faces of the rotatable brake elements to the atmosphere.

A plurality of apertures 59 are provided through the torque ring 15 connecting chamber 58 to the atmosphere, while a plurality of apertures 60 are provided through the annular plate 27 connecting chamber 58 to a chamber 61 formed between the opposite face of said plate and the annular brake cylinder device 36.

The annular plate 27 is provided with a plurality of radially arranged fan blades 62 projecting therefrom into chamber 61. Apertures 63 are provided through the web 38 of the brake cylinder device between the ribs 39 connecting chamber 61 to the atmosphere. It will be noted that the ribs 39 on the inside of the brake cylinder device form in effect channels which open close to the adjacent edges of the fan blades 62.

Outside of the brake cylinder device 36 the two rods 41 extend through spacer washers 90 and suitable openings in a torque bar 64 which is shaped to extend under and clear the axle 1. Beyond the peripheral surface of the brake cylinder device the bar 64 is bent inwardly toward the center of the truck. The ends of the inwardly bent portions of the two torque bars 64 connected to the brake mechanism adjacent both wheels are rigidly bolted to the opposite sides of a spacer block 65 which may be made of wood or any other desired material.

A bracket 66 is secured to the truck transom 7 adjacent the transverse center thereof and this bracket has a jaw in which the block 65 and the connected ends of the two torque bars 64 are disposed for supporting same and for holding the non-rotatable brake elements 32, 33 and 34 and the brake cylinder device 36 against rotation with the rotatable brake elements 19, 25 and 26.

Encircling each of the rods 41 and bearing against the torque bar 63 adjacent each of the brake mechanisms is a release spring 67. The free end of each of the release springs 67 is supported on a pressure plate 68 slidably mounted on the bar 41 and to this pressure plate are connected two release rods 69 disposed one below and one above the rod 41.

The release rods 69 extend toward the adjacent wheel 1 and are slidably mounted in suitably aligned bores provided through the adjacent portion of the torque bar 64 and each portion 40 of the brake cylinder device 36 and from thence through suitable bores in the aligned ear portions 45 of the non-rotatable brake elements 32, 33 and 34. The rods 69 have a free sliding fit in the bores through the ear portions of the non-rotatable elements 34, while fitted over the outer end of each of said rods is a stepped sleeve 70, the inner and smaller cylindrical portion of which has a sliding fit in the bore through the adjacent ear portion 45 of the non-rotatable element 33, while the outer and larger cylindrical portion has a sliding fit in the bore in the adjacent ear portion of the non-rotatable element 32.

A washer 73 is secured over the end of each rod 69 in engagement with the sleeve 70 and is secured in place by a nut 71 on the rod. Suitable adjusting nuts 72 are provided on the opposite ends of each rod 69 for engaging the pressure plate 68.

The springs 67 are provided for urging the several non-rotatable elements and brake cylinder piston 48 away from the wheel to their release position in which said piston engages the inner end of the bore in which it operates. Each of the sleeves 70 is so designed that with the brake cylinder piston 48 in this position, the inner ends of said sleeves will hold the non-rotatable braking element 34 in engagement with the several pressure pins 51 and thus spaced from the rotatable braking element 26, while the shoulders 74 formed on the sleeves at the junction of the cylindrical portions thereof and the washers 73 will engage and space the non-rotatable braking elements 33 and 32, respectively, substantially midway between the rotatable brake elements at the opposite sides thereof.

Since the non-rotatable brake elements are supported only at diametrically opposite sides thereof and on relatively small bearings on the rods 41, it will be apparent that any looseness of the elements 32 and 33 on their bearings would tend to permit the top and bottom portions thereof, to tip sideways toward the adjacent rotatable elements, and if this looseness were sufficient, dragging of the non-rotatable elements 32 and 33 on said rotatable elements would occur. This could not occur with the non-rotatable element 34 however, since the springs 67 pull it against the several spaced pressure pins 51 which ensures it being properly spaced from the rotatable element 26 when in its release position.

In order to ensure that the non-rotatable elements 32 and 33 will never drag against the adjacent rotatable elements when in their release position, a release device 75 is secured to the top and bottom portions of the non-rotatable element 34. This device is provided at one side with a hook 76 adapted to engage a lug 77 on the non-rotatable element 33 and on the opposite side with a hook 78 adapted to engage a lug 79 on the non-rotatable element 32; these hooks being so arranged as to space the non-rotatable elements 32 and 33 in their proper release position with respect to the non-rotatable element 34 and thus with respect to the rotatable braking elements at either side thereof. Since the devices 75 are provided at both the top and bottom of the non-rotatable brake elements it will be evident that they coact to accomplish the purpose above described. It will be noted that the hooks 76 and 78 are designed so as not to interfere with free serial movement of the non-rotatable elements in the direction of the wheel 2.

Each of the rods 41 secured to the brake mechanism adjacent one of the wheels 2 is provided at its outer end with a screw 80 (Fig. 9) threaded axially into the end of the rod and having a head 81 abutting against the adjacent end of the rod 41 extending from and secured to the brake mechanism adjacent the opposite wheel. Each of the screws 80 and the adjacent ends of the rods 41 are rigidly secured together in axial alignment by a split clamp 82 encircling the ends of the rods and said screw and clamped thereto by bolts 83.

*Assembly of the brake mechanism to a wheel and axle assembly*

The brake mechanisms above described are adapted to be assembled around the axle 1 of a wheel and axle assembly preferably after one of the wheels 2 is secured in place on the axle 1 but before the other wheel is mounted on said axle. After the brake mechanisms are thus mounted on the axle 1 the second wheel 2 is adapted to be secured in place thereon following which the various parts of the brake mechanism are secured in place as will be later described in detail.

Before mounting on the axle 2, the several rotatable and non-rotatable braking elements are all mounted in their proper interleaved relation around the torque pins 18 and with the rotatable elements and release springs 30 and 31 mounted in their working positions on the sleeve-like extensions 21 of the torque pin nuts 20. The annular plate 27 is also mounted in place and secured to the support ring 10 by the assembling screws 28 which coact with the torque pins 18 to rigidly hold the several parts of this unit assembly in their working relation until applied to a wheel 2.

Also before application to the axle 2, the brake cylinder piston 48 is mounted in its cylinder and the heat deflector ring 55 is mounted on the piston pins 51.

Two preassembled units embodying the annular braking elements and brake cylinder device as just described are provided for each axle 2, as will be evident.

With the units assembled as above described and one wheel mounted on the axle 2, the brake mechanism is applied to the axle in the following order.

First an assembly embodying the annular braking elements is mounted over the end of the axle 1 with the torque ring 15 leading for application to the wheel already on the axle, and this assembly is followed by a brake cylinder assembly having the piston pins 51 pointing toward the wheel. Next another brake cylinder assembly and finally another assembly of braking elements is applied over the axle arranged for application to the wheel to be applied to the axle. The second wheel 2 is now assembled on the axle 1 in its working position.

A split sleeve 9 is next placed in position around the axle adjacent each wheel and the assemblies embodying the support rings 10 and braking elements are slipped on to these sleeves toward their respective wheels. The bolts 29 are next applied through these assemblies and screwed into the hubs of the wheel 2.

It will be noted that as the bolts 29 are tightened the interengagement of the shoulders 12 and 11 on the support rings 10 and split sleeves 9 draw said sleeves up the tapered surfaces on the axle 1 and this drawing action is continued until the split sleeves engage the collars 8. The split sleeves 9 are preferably so designed as to be expanded tightly against the support ring 10 during this drawing operation and it will be evident that this whole structure provides a very rigid connection between the wheels, and the axle and the assemblies of brake elements, and it will be further noted that this structure acts to pull the wheels 2 more tightly on to the axle 1 and will thus preclude loose wheels.

After the bolts 29 are tightened as just described, the two brake cylinder assemblies are mounted on their respective bearings 35.

Next, two of the rods 41 are slipped through each of the torque bars 64 and the washers 90 in turn slipped in place, and these assemblies, oppositely disposed, are then brought up from below the axle to their working positions and the ends of the rods 41 are threaded into the openings through the brake cylinder device 36, and the non-rotatable braking elements 34, 33 and 32 during which operation the threads on the rods 41 engage those in the brake cylinder devices and said rods are screwed home against the brake cylinder devices. During the application of the rods 41, the non-rotatable braking elements are lifted to their working positions in concentric relation with the rotatable braking elements, as will be evident.

The stepped sleeves 70 may next be slipped into the apertures through the non-rotatable braking elements 32 and 33. This operation may be effected through the space between the wheels 2 and the non-rotatable brake element 32.

The release springs 67 and pressure plates 68 are next applied to the rods 41 following which the release rods 69 are threaded through the openings in said pressure plates 68, the torque bars 64, the brake cylinder devices 36, the non-rotatable braking elements 34 and finally through the stepped sleeves 70. The washers 73 and nuts 71 are then applied to the ends of the rods 69 adjacent the wheels, and the adjusting nuts 72 applied to the opposite ends of the rods. The adjusting nuts 72 are then operated to compress the springs 67 to provide the desired pressure for pulling the non-rotatable braking elements and brake cylinder pistons 48 to their release positions hereinbefore described.

A clamp 82 may next be slipped on to one of the rods 41 at each of the opposite sides of the axle and then the oppositely disposed rods 41 for each brake mechanism are lined up with each other. The screw 80 in one of each of the axially aligned pairs of rods 41 is then screwed out of the one rod into engagement with the adjacent end of the other rod and then upon further turning of the screws 80, said rods and thereby the brake cylinder devices 36 and non-rotatable brake elements adjacent both of the wheels 2 are moved apart until the two sets of non-rotatable braking elements 32 and 33 are positioned substantially midway between the rotatable braking elements at the opposite sides thereof, all of said braking elements being at this time in their release positions. After this adjustment is effected, the clamps 82 are slipped over the adjacent ends of the axially aligned rods 41 and over the screws 63 and securely clamped by bolts 83 to said rods for supporting same in axial alignment.

When a vehicle truck frame is mounted on the wheel and axle assembly, the outer ends of the two torque bars 64 and the spacer block 65 to which said ends are connected are disposed within the jaw of bracket 66 which is then rigidly secured to the transom 7.

*Operation*

If a vehicle truck provided with the improved brake mechanism is rolling along the rails 3 and it is desired to retard or stop, or in other words brake the wheels 2, fluid under pressure is supplied through the pipes 54 to the brake cylinder piston chambers 53 and therein acts on the brake cylinder pistons 48 to effect movement thereof in the direction of the adjacent wheel 2.

As the brake cylinder pistons 48 are thus shifted the piston in each mechanism acts through the piston pins 51 to slide the non-rotatable braking elements 34 on the rods 41 into engagement with the rotatable braking element 26. The element 26 is then picked up and shifted relative to the torque pins 18 into engagement with the non-rotatable braking element 33 which is then shifted along the rods 41 into engagement with the rotatable element 25. The element 25 is next shifted on the torque pins 18 into engagement with the non-rotatable element 32 which is then picked up and slipped along the rods 41 into engagement with the rotatable braking element 19 which is fixed against axial movement.

After the several non-rotatable and rotatable friction brake elements are thus all moved into frictional interengagement, the pressure of fluid supplied to pressure chamber 53 to act on the brake cylinder piston 48 in each of the brake cylinder devices forces said elements together with pressure, whereupon the non-rotatable elements, which are held against turning by the torque bars 64, create a drag upon the rotatable braking elements which is transmitted through the torque pins 18, torque ring 15 and screws 29 to the wheel 2 to effect braking thereof. The thrust of the brake cylinder piston 48 against the annular braking elements is taken through the torque ring 15, support ring 10 and split sleeve 9 by the collar 8 provided on the axle 1, as will be evident.

The degree with which the rotatable braking elements and thereby the wheels are braked as just described, depends upon the pressure of the fluid supplid to pressure chamber 53 to act on the brake cylinder piston 48 in each of the brake cylinder devices and may be varied in any desired well known manner to provide any chosen degree of braking.

It will be noted that the bars 41 connecting the two brake cylinder devices support same in predetermined spaced relation against the brake cylinder pressure acting in chambers 53 tending to move them toward each other. In other words the reaction of brake cylinder pressure in one of the brake cylinder devices is counterbalanced through the rods 41 by the equal and opposite reaction of the brake cylinder pressure in the other brake cylinder device. By this arrangement no means are required in the brake mechanism adjacent each wheel to support the brake cylinder device against axial movement when an application of the brakes is effected.

It will be evident that in effecting an application of the brakes, one side of the brake cylinder piston 48 may start moving in the direction of the brake elements ahead of the opposite side due to differences in friction or the like. However this is immaterial since, due to the tapered piston head 49, the piston can not become bound against movement in its cylinder.

As the braking elements are moved together in effecting an application of the brakes, the several release springs 30 and 31 between the rotatable brake elements, and the release springs 67 acting on the non-rotatable brake elements are all compressed as will be evident.

In order to effect a release of the brakes after an application, the fluid under pressure is released from the brake cylinder piston chambers 53, whereupon the several release springs 30, 31 and 67 act to move the rotatable and non-rotatable brake elements and the brake cylinder pistons 48 back to their release positions which are defined by stops hereinbefore described. During this release movement of the non-rotatable brake elements the release devices 75 also act to centralize the top and bottom portions of the non-rotatable brake elements between the rotatable brake elements, as before described.

Attention is directed to the fact that the springs 67 located at opposite sides of the axle 1 around the backing up rods 41 not only move the non-rotatable brake elements to their release positions but also move the brake cylinder pistons 48 to their release positions. This movement of the brake cylinder pistons to their release positions against the relatively high friction of the brake cylinder pistons in their cylinder bores could not readily be accomplished and ensured by a plurality of relatively small springs such as the springs 30 and 31. The springs 67 are thus provided to accomplish this result and have been so associated with the non-rotatable brake elements as to coact with the release devices 75 to provide the desired release movement and positioning of said elements.

With the braking elements thus moved to their release positions, the rotatable brake elements are again free to rotate with the wheels 2 as will be evident.

Cooling system

While the wheels 2 and the parts of the brake mechanism associated therewith are turning, the sidewalls of slots 57 in the rotatable brake elements in each brake mechanism act as fan blades to draw air from chamber 58, which is open to the atmosphere through apertures 59, and expel it through the outer ends of said slots to the atmosphere. When the braking elements are in frictional braking engagement, this blast of air through the slots 57 not only passes through the rotatable braking elements but also flows across the braking faces of the non-rotatable braking elements and thus carries away heat created in said elements due to frictional contact so as to maintain said elements sufficiently cool to provide efficient braking.

The slots 57 also perform another important function during braking in that they act to collect from the friction faces of the braking elements any pieces of metal which may be torn therefrom or any other foreign material, which is then promptly expelled to the atmosphere with the blasts of air through said slots. Due to this action the friction faces of the braking elements are maintained clean so as to provide a most intimate contact between said faces with the result that a most efficient and uniform braking occurs.

The fan blades 62 in each brake mechanism act during rotation of the wheels 2 to draw air from the chamber 61, which is open to the atmosphere through apertures 63, and force it out through the space between the adjacent sides of the non-rotatable braking element 34 and brake cylinder device 36. The ring 55 is so disposed that the blast of air forced through this space flows over both of the opposite faces of the ring.

The ring 55 is provided in each brake mechanism to protect ring like cylinder portion 37 of the brake cylinder device 36 against becoming heated by heat developed in the annular braking elements when in frictional braking engagement. In order to accomplish this result, the side of the ring 55 facing the non-rotatable brake element 34 is highly polished to reflect heat back toward the brake elements. The ring is also made of material such as copper or an alloy thereof which is capable of giving up heat very rapidly, so that whatever heat is absorbed by the ring will be quickly given up to the stream of air forced across the opposite faces thereof by the fan blades 62. By these arrangements, the brake cylinder device is efficiently insulated against the heat developed in the braking elements during braking so that the lubricant in said device and the packing cup 50 on the brake cylinder piston 48 will last as long as in conventional type of fluid pressure brake equipments.

The ribs 39 provided on the web of the brake cylinder device adjacent the fan blades 62 are provided to guide the air entering chamber 61 through the apertures 63 into substantial contact with the fan blades 62 so as to reduce turbulence of the air in said chamber and thus increase the output efficiency of the fan blades.

The apertures 60 through the annular plate 27 connect chambers 58 and 61 so that the fan blades 62 and slots 57 in the rotatable brake elements may draw on the air supply from either one or both of said chambers.

Summary

From the above description of the invention it will be noted that the improved brake mechanism is so designed as to occupy very little space adjacent the inner face of the vehicle wheel 2 and therefore is adapted for use on low positioned railway vehicles where various parts of the vehicle such as the body center sill is disposed so low as to merely clear the axle 1. The backing up rods 41 which extend across the truck between the brake mechanisms connected to the two wheels are all disposed at a level below the top of axle 1 and therefore will provide no interference.

It will also be noted that the improved brake mechanism is not only compact, but it is so designed that various parts thereof may be assembled into units on a bench or the like before application as units to the wheel and axle assembly. The time required for application to a wheel and axle assembly is thus materially reduced and difficulties incident to the handling of a large number of relative small parts at the time of mounting on a wheel and axle assembly is overcome.

It will further be noted that the brake mechanism is relatively simple in construction and so designed as to provide efficient braking of a wheel and axle assembly.

While only one illustrative embodiment of the invention has been shown and described in detail, it is not the intention to limit its scope to that embodiment or otherwise than by the terms of the appended claims.

Having now described our invention, what we claim as new and desire to secure by Letters Patent, is:

1. A brake mechanism for a wheel and axle assembly of a railway vehicle truck, said mechanism comprising annular rotatable and non-rotatable friction brake elements disposed in coaxial relation with one of the wheels of said assembly and a brake cylinder device disposed in coaxial relation to said elements and operative to move said elements into frictional engagement for braking said wheel, a structure carrying said elements and brake cylinder device and secured to said axle against axial movement whereby said axle takes the thrust of said brake cylinder device on said elements, and torque means independent of said axle securing said rotatable element to said wheel for rotation therewith.

2. A brake mechanism for a wheel and axle assembly of a railway vehicle truck, said mechanism comprising annular rotatable and non-rotatable friction brake elements disposed in coaxial relation with one of the wheels of said assembly and a brake cylinder device disposed in coaxial relation to said element and operative to move said elements into frictional engagement for braking said wheel, said elements being disposed between said brake cylinder device and wheel, a member secured to said axle against axial movement in the direction of said wheel and carrying said elements and brake cylinder device, and torque means independent of said axle securing said rotatable element to said wheel for rotation therewith.

3. A brake mechanism for a wheel and axle assembly of a railway vehicle truck, said mechanism comprising annular rotatable and non-rotatable friction brake elements disposed in coaxial relation with one of the wheels of said assembly and a brake cylinder device disposed in coaxial relation to said elements and operative to move said elements into frictional engagement for braking said wheel, a structure secured to said axle against axial movement for taking the thrust of said brake cylinder device on said elements, said structure carrying said elements and brake cylinder device, means counteracting the pressure of said brake cylinder device on said elements, and a plurality of torque pins securing said rotatable element to said wheel for rotation therewith.

4. A brake mechanism for a wheel and axle assembly of a railway vehicle truck, said mechanism comprising annular rotatable and non-rotatable friction brake elements arranged in coaxial relation with one of the wheels of said assembly and adapted to be moved into frictional interengagement to effect braking of said wheel, a brake cylinder device operatively connected to one of said elements for moving said one element against the other element, a structure carrying said elements and secured to said axle against axial movement to take the thrust of said brake cylinder device on said elements, and torque means securing said rotatable brake element to said wheel for rotation therewith.

5. A brake mechanism for a wheel and axle assembly of a railway vehicle truck, said mechanism comprising annular rotatable and non-rotatable friction brake elements arranged in coaxial relation with one of the wheels of said assembly and adapted to be moved into frictional interengagement to effect braking of said wheel, a brake cylinder device operatively connected to one of said elements for moving said one element against the other element, said axle having an annular collar, a structure carrying said elements and adapted to engage said collar for supporting said elements against the thrust of said brake cylinder device, and a plurality of torque pins securing said structure against said collar and also securing said rotatable elements to said wheel for rotation therewith.

6. A brake mechanism for a wheel and axle assembly of a railway vehicle truck, said mechanism comprising annular rotatable and non-rotatable friction brake elements arranged in coaxial relation with one of the wheels of said assembly and adapted to be moved into frictional interengagement to effect braking of said wheel, a brake cylinder device operatively connected to one of said elements for moving said one element against the other element, a structure carrying said rotatable element and secured to said axle against axial movement in the direction away from said non-rotatable element, torque means securing said rotatable element to said wheel for rotation therewith, said brake cylinder device being journaled on said structure and carrying said non-rotatable element, and means acting on said brake cylinder device to counteract the pressure thereof on said element.

7. A brake mechanism for a wheel and axle assembly of a railway vehicle truck, said axle having an annular shoulder adjacent one of said wheels, a structure mounted on said axle against said shoulder for preventing movement thereof in the direction of said wheel, a plurality of torque screws securing said structure against said shoulder and to said wheel for rotation with said wheel, an annular rotatable friction braking element secured to said structure for rotation with said wheel, an annular brake cylinder device journaled on said structure, an annular non-rotatable brake element supported by said brake cylinder device in coaxial relation with said rotatable element and movable thereby into frictional engagement with said rotatable element to brake said wheel, and means independent of said assembly and structure acting on said brake cylinder device counteracting the thrust of said brake cylinder device on said elements.

8. A brake mechanism for a wheel and axle assembly of a railway vehicle truck, said axle having an annular shoulder adjacent one of said wheels, a structure mounted on said axle against said shoulder for preventing movement thereof in the direction of said wheel, a plurality of torque screws securing said structure against said shoulder and to said wheel for rotation with said wheel, an annular rotatable friction braking element secured to said structure for rotation with said wheel, an annular brake cylinder device journaled on said structure, an annular non-rotatable brake element supported by said brake cylinder device in coaxial relation with said rotatable element and movable thereby into frictional engagement with said rotatable element to brake said wheel, and means securing said brake cylinder device against axial movement on said structure.

9. A brake mechanism for a wheel and axle assembly of a railway vehicle truck comprising a support ring disposed in coaxial relation with one of the wheels of said assembly, means securing said ring to said one of the wheels of said assembly for rotation therewith, an annular rotatable friction brake element secured to rotate with said ring, an annular brake cylinder device journaled on said ring, an annular non-rotatable friction brake element supported by said brake cylinder device and movable thereby into frictional engagement with said rotatable element to brake said wheel, and means independent of said ring acting on said brake cylinder device to counteract the thrust thereof on said non-rotatable element.

10. A brake mechanism for a wheel and axle assembly of a railway vehicle truck, said axle having a stop shoulder adjacent one of said wheels, said mechanism comprising a structure encircling said axle, a plurality of securing members securing said structure to said wheel and against said shoulder, annular rotatable and non-rotatable friction brake elements encircling said axle, said rotatable element being secured to said structure for rotation with said wheel, an annular brake cylinder device encircling said axle and journaled on said structure and supporting said non-rotatable brake element in coaxial relation with said rotatable element, said brake cylinder device being operative to move said non-rotatable element into frictional engagement with said rotatable element to effect braking of said wheel, and means acting on said brake cylinder device counteracting the thrust thereof on said elements.

11. A brake mechanism for a wheel and axle assembly of a railway vehicle truck, said axle having a stop shoulder adjacent one of said wheels, said mechanism comprising a split sleeve mounted on said axle for engaging said shoulder, a ring carried by said sleeve and having interlocking engagement therewith in the direction of said shoulder, a plurality of screws securing said ring to said wheel and to said sleeve against said shoulder, a structure carried by said ring for rotation with said wheel including an annular rotatable friction braking element encircling said axle, an annular brake cylinder device encircling said axle and journaled on said ring, an annular non-rotatable friction brake element encircling said axle and carried by said brake cylinder device in coaxial relation with said rotatable element and movable by said brake cylinder device into frictional braking engagement with said rotatable element to brake said wheel, and means acting on said brake cylinder device counteracting the pressure thereof on said brake elements.

12. A brake mechanism for a wheel and axle assembly of a railway vehicle truck comprising a ring-like structure having an outstanding radial flange, an annular ring rigidly secured to one side of said flange, a removable annular ring rigidly secured to the opposite side of said flange, a plurality of assembling screws extending through said removable ring and having screw-threaded engagement with said flange, a plurality of securing means extending through both of said rings and said flange and secured to one wheel of said assembly for rotating said structure and rings with said wheel, a plurality of torque pins extending between and carried by said rings in spaced relation, a plurality of annular rotatable friction brake elements slidably mounted on said pins in coaxial relation with said wheel, a plurality of annular, non-rotatable friction brake elements interleaved with said rotatable elements, and means associated with said structure operative to effect movement of said non-rotatable and rotatable elements into frictional interengagement to effect braking of said wheel.

13. A brake mechanism for a wheel and axle assembly of a railway vehicle truck comprising two spaced annular support members arranged in coaxial relation with one of the wheels of said assembly and secured to said wheel for rotation therewith, a plurality of spaced torque pins extending parallel to the axis of said assembly and secured at one end to one of said support members and extending through an aperture in the other support member, a nut on each of said pins engaging the outer face of said other support member, each of said nuts having a sleeve projecting through the aperture in the one support member and provided between said support members with a plurality of cylindrical guide sections of different diameters stepped down in the direction away from the nut, a plurality of annular rotatable friction braking elements corresponding in number to the guide sections on said sleeves disposed between said support members, one of said rotatable friction brake elements having apertures through which one of the guide sections of said nuts extends for slidably supporting the rotatable element in coaxial relation with and for rotation with said wheel, annular non-rotatable friction brake elements interleaved with said rotatable friction brake elements, and brake cylinder means operatively connected to said elements for effecting movement thereof into frictional interengagement to effect braking of said wheel.

14. A brake mechanism for a wheel and axle assembly of a railway vehicle truck comprising two spaced annular support members arranged in coaxial relation with one of the wheels of said assembly and secured to said wheel for rotation therewith, a plurality of spaced torque pins extending parallel to the axis of said assembly and secured at one end to one of said support members and extending through an aperture in the other support member, an annular rotatable friction brake element mounted on said torque pins in coaxial relation with and for rotation with said wheel, a nut on each of said pins engaging the outer face of said other support member and having a sleeve extending through said aperture and engaging said rotatable element holding same against the adjacent support member, another annular rotatable friction brake element mounted on the sleeve of each of said nuts to slide axially thereof and to rotate with said wheel, an annular non-rotatable friction braking element interleaved with said rotatable brake elements at each of the opposite sides of the rotatable brake element mounted to slide on said sleeves, means for supporting said non-rotatable elements, and means for moving said non-rotatable elements and the rotatable element interposed between in the direction of the other rotatable brake element to effect frictional interengagement between said elements to brake said wheel.

15. A brake mechanism for a wheel and axle assembly of a railway vehicle truck comprising a pile of interleaved and axially movable rotatable and non-rotatable friction brake elements having release positions in which they are disengaged from each other and braking positions in frictional interengagement to effect braking of one of said wheels, a brake cylinder piston movable from a release position to an application position for effecting movement of said brake elements from their release positions to their application positions, spring means interposed between and acting on said rotatable brake elements for effecting movement thereof from their braking positions to their release positions, means for defining the release positions of said rotatable braking elements, means for defining the release position of said piston, spring means for moving said non-rotatable elements and brake cylinder piston to their release positions, and means associated with said spring means and operative upon the operation thereof to serially pick up said non-rotatable elements in the proper spaced relation to define their release positions with said piston in its release position.

16. A brake mechanism for a wheel and axle assembly of a railway vehicle truck comprising a pile of interleaved and axially movable rotatable and non-rotatable friction brake elements having release positions in which they are disengaged from each other and braking positions in frictional interengagement to effect braking of one of said wheels, means operatively connected to said brake elements to effect movement thereof from their release positions to their braking positions, spring means interposed between and acting on said rotatable brake elements for moving same from their braking positions to their release positions, spring means at either side of said axle operative on diametrically opposite side portions of said non-rotatable elements for effecting movement thereof to their release positions, and means disposed adjacent the top and bottom portions of said non-rotatable elements operative in the release position of one of said non-rotatable elements to position the top and bottom portions of the other non-rotatable elements in their release positions.

17. A brake mechanism for a wheel and axle assembly of a railway vehicle truck comprising a pile of interleaved and axially movable rotatable and non-rotatable friction brake elements having release positions in which they are disengaged from each other and braking positions in frictional interengagement to effect braking of one of said wheels, a brake cylinder piston disposed at one end of said pile of elements having a release position and movable therefrom to an application position for effecting movement of said elements from their release positions to their application positions, spring means interposed between and acting on said rotatable brake elements for moving same from their application positions to their release positions, spring means at either side of said axle operative on diametrically opposite side portions of said non-rotatable elements for effecting movement thereof from their application positions to their release positions, and means associated with top and bottom portions of the non-rotatable element adjacent said brake cylinder piston and operative upon movement thereof to its release position to centralize the top and bottom portions of the other non-rotatable elements between the adjacent rotatable elements.

18. A brake mechanism for a wheel and axle assembly of a railway vehicle truck comprising annular rotatable and non-rotatable friction brake elements disposed in coaxial relation with said assembly and operative upon frictional engagement to brake said assembly, means securing the rotatable element to said assembly for rotation therewith, an annular brake cylinder device for actuating said elements disposed in coaxial relation with said elements and spaced axially therefrom, said rotatable element having in its braking face a plurality of radial slots the side walls of which constitute fan blades for creating a circulation of air between said elements upon rotation of said rotatable element, and fan means associated with and rotatable by said assembly for forcing air through the space between said brake elements and brake cylinder device to minimize the transfer of heat from said braking elements, incident to braking, to said brake cylinder device.

19. A brake mechanism for a wheel and axle assembly of a railway vehicle truck comprising annular rotatable and non-rotatable friction brake elements disposed in coaxial relation with said assembly and operative upon frictional engagement to brake said assembly, means securing the rotatable element to said assembly for rotation therewith, an annular brake cylinder piston for actuating said elements disposed in coaxial relation with said elements and spaced axially therefrom, and a member disposed in the space between said elements and brake cylinder piston completely shielding said piston from said elements, said member having a face adjacent said elements, constituting a reflector for reflecting heat, incident to frictional contact between said elements, away from said brake cylinder piston.

20. A brake mechanism for a wheel and axle assembly of a railway vehicle truck comprising annular rotatable and non-rotatable friction brake elements disposed in coaxial relation with said assembly and operative upon frictional engagement to brake said assembly, means securing the rotatable element to said assembly for rotation therewith, an annular brake cylinder piston for actuating said elements disposed in coaxial relation with said elements and spaced axially therefrom, a relatively thin member disposed in the space between said elements and brake cylinder piston shielding said piston from said elements and having high heat conductivity and adapted to take up heat from said space incident to frictional engagement of said elements, and a fan secured to rotate with said wheel and arranged to create a draft of air over both of the opposite faces of said member for carrying away heat therefrom.

21. A brake mechanism for a wheel and axle assembly of a railway vehicle truck comprising annular rotatable and non-rotatable friction brake elements disposed in coaxial relation with said assembly and operative upon frictional engagement to brake said assembly, means securing the rotatable element to said assembly for rotation therewith, an annular brake cylinder piston for actuating said elements disposed in coaxial relation with said elements and spaced axially therefrom, a relatively thin member disposed in the space between said elements and brake cylinder piston shielding said piston from said elements and having a heat reflecting surface on the side adjacent said elements for reflecting heat away from said brake cylinder piston, said member also having high heat conductivity and adapted to take up heat from said space incident to frictional engagement of said elements, and a fan secured to rotate with said wheel and arranged to create a draft of air over both of the opposite faces of said member for carrying away heat therefrom.

22. A brake mechanism for a wheel and axle assembly of a railway vehicle truck comprising annular rotatable and non-rotatable friction braking elements arranged in coaxial relation with said assembly and operative upon frictional interengagement to effect braking of said assembly, a structure secured to said assembly and carrying said rotatable element for rotation therewith, an annular brake cylinder device for actuating said elements journaled on said assembly and spaced from said elements, a plurality of pressure pins operatively connecting said brake cylinder device to said elements, a relatively thin annular ring carried by said pins in the space between said elements and brake cylinder device shielding said brake cylinder device from said elements, said annular ring having a polished face adjacent said elements for reflecting heat, incident to frictional engagement between said elements, away from said brake cylinder device, said annular ring also being made of material having high heat conductivity, and fan means associated with said structure and arranged upon rotation of said structure to effect a flow of air through said space over both faces of said annular ring for dissipating heat from said ring.

23. A brake mechanism for a wheel and axle assembly of a railway vehicle truck comprising annular rotatable and non-rotatable friction braking elements arranged in coaxial relation with said assembly and operative upon frictional interengagement to effect braking of said assembly, a structure secured to said assembly and carrying said rotatable element for rotation therewith, an annular brake cylinder device for actuating said elements journaled on said assembly and spaced from said elements, a plurality of pressure pins operatively connecting said brake cylinder device to said elements, a relatively thin annular ring carried by said pins in the space between said elements and brake cylinder device shielding said brake cylinder device from said elements, said annular ring having a polished face adjacent said elements for reflecting heat, incident to frictional engagement between said elements, away from said brake cylinder device, said annular ring also being made of material having high heat conductivity, said structure providing a chamber open to the atmosphere and to the inner peripheries of said elements, said rotatable braking element having a plurality of radial slots across the braking face, the side walls of said slots constituting fan blades for creating a circulation of air through said chamber between said elements and through the outer ends of said slots to the atmosphere, said structure and brake cylinder device constituting two walls of a chamber open to said space and also open through said brake cylinder device to the atmosphere, and fan blades in the last named chamber secured to rotate with said structure for creating a circulation of air through said chamber and space to the atmosphere over both faces of said annular ring for dissipating heat from said ring.

24. A brake arrangement for a wheel and axle assembly of a railway vehicle truck comprising a pair of oppositely disposed brake mechanisms one disposed adjacent each of said wheels, the brake mechanism adjacent each wheel comprising annular rotatable and non-rotatable friction brake elements encircling said axle in coaxial relation with said wheel and arranged in the order named with the rotatable brake element disposed at the side of said non-rotatable element adjacent said wheel and secured to rotate with said wheel, and an annular brake cylinder device for actuating said elements disposed at the opposite side of said non-rotatable element, means supporting said non-rotatable brake element and brake cylinder device, said brake cylinder device being operative to move said non-rotatable element against said rotatable element to effect braking of said assembly, and rigid means extending between and secured at opposite ends to the two brake cylinder devices of said mechanism for supporting said brake cylinder devices against the thrust thereof on said brake elements.

25. A brake arrangement for a wheel and axle assembly of a railway vehicle truck comprising a pair of oppositely disposed brake mechanisms one disposed adjacent each of said wheels, the brake mechanism adjacent each wheel comprising annular rotatable and non-rotatable friction brake elements encircling said axle in coaxial relation with said wheel and arranged in the order named with the rotatable brake element disposed at the side of said non-rotatable element adjacent said wheel and secured to rotate with said wheel, and an annular brake cylinder device for actuating said elements disposed at the opposite side of said non-rotatable element, means supporting said non-rotatable brake element and brake cylinder device, said brake cylinder device being operative to move said non-rotatable element against said rotatable element to effect braking of said assembly, and rigid means extending between and secured at opposite ends to the two brake cylinder devices of said mechanism for supporting said brake cylinder devices against the thrust thereof on said brake elements, said rigid means being adjustable longitudinally thereof for adjusting the positions of said non-rotatable brake element and brake cylinder device with respect to said rotatable brake element in both mechanism.

26. A brake arrangement for a wheel and axle assembly of a railway vehicle truck comprising a pair of oppositely disposed brake mechanisms one disposed adjacent each of said wheels, the brake mechanism adjacent each wheel comprising annular rotatable and non-rotatable friction brake elements encircling said axle in coaxial relation with said wheel and arranged in the order named with the rotatable brake element disposed at the side of said non-rotatable element adjacent said wheel and secured to rotate with said wheel, and an annular brake cylinder device for actuating said elements disposed at the opposite side of said non-rotatable element, means supporting said brake cylinder device on said assembly, a pair of rods carried by oppositely disposed portions of said brake cylinder device supporting said non-rotatable brake element, said brake cylinder device being operative by fluid under pressure to move said non-rotatable brake element against said rotatable element to effect braking of said wheel, said rods extending parallel to the axle of said assembly with the rods of one mechanism in axial alignment with the rods of the other mechanism, means operatively connecting each pair of axially aligned rods for adjusting said rods longitudinally to adjust the position of said non-rotatable element and brake cylinder device with respect to said rotatable element in both brake mechanisms, and means for securing said rods in axially aligned adjusted relation, said rods being operative to support said brake cylinder device against the thrust thereof on said non-rotatable brake element in both brake mechanisms.

27. A brake arrangement for a wheel and axle assembly of a railway vehicle truck having a truck frame supported on said assembly, said arrangement comprising a pair of oppositely disposed brake mechanisms one disposed adjacent each of the wheels of said assembly, and each of said mechanisms comprising annular rotatable and non-rotatable friction brake elements encircling said axle and a brake cylinder device for effecting frictional interengagement between said elements for braking said assembly, means securing said rotatable element to rotate with the adjacent wheel, supporting means for said brake cylinder device and non-rotatable element, and a forked structure connected at its apex end to said frame and at its opposite ends to said brake cylinder device and non-rotatable element in both brake mechanisms for holding said same against rotation.

28. A brake arrangement for a wheel and axle assembly of a railway vehicle truck having a truck frame supported on said assembly, said arrangement comprising a pair of oppositely disposed brake mechanisms one disposed adjacent each of the wheels of said assembly, and each of said mechanisms comprising annular rotatable and non-rotatable friction brake elements, and an annular brake cylinder device, said elements and brake cylinder device encircling said axle, and said brake cylinder device being operative to effect frictional interengagement between said elements to brake said assembly, sleeve-like means supporting said rotatable element to rotate with the adjacent wheel, said brake cylinder device being journaled on said means, rods carried by said brake cylinder device supporting said non-rotatable element, and a structure connected to said rods in both brake mechanisms and also having a connection with a central transverse portion of said frame and operative to hold the brake cylinder device and non-rotatable brake elements in both brake mechanisms against turning.

29. A brake arrangement for a wheel and axle assembly of a railway vehicle truck having a truck frame supported on said assembly, said arrangement comprising a pair of oppositely disposed brake mechanisms one disposed adjacent each of the wheels of said assembly, and each of said mechanisms comprising annular rotatable and non-rotatable friction brake elements, and an annular brake cylinder device, said elements and brake cylinder device encircling said axle, and said brake cylinder device being operative to effect frictional interengagement between said elements to brake said assembly, sleeve-like means supporting said rotatable element to rotate with the adjacent wheel, said brake cylinder device being journaled on said means, rods carried by said brake cylinder device supporting said non-rotatable element, springs carried by said rods acting on said non-rotatable brake element for effecting disengagement thereof from said rotatable element, and a rigid torque element having one end mounted on said rods and urged in the direction of said brake cylinder by said springs, the opposite end of said torque element being disposed adjacent the transverse center of said truck frame, means securing said opposite end of the two torque elements together, and means securing the joined ends of said torque elements to said truck frame whereby said torque elements are operative to hold said brake cylinder device and non-rotatable element against rotation.

30. A brake mechanism for a wheel and axle assembly of a railway vehicle truck comprising a pile of interleaved and axially movable rotatable and non-rotatable friction brake elements having release positions in which they are disengaged from each other and braking positions in frictional interengagement to effect braking of one of said wheels, means operatively connected to said brake elements to effect movement thereof from their release positions to their braking positions, spring means acting on said rotatable brake elements for moving same from their braking positions to their release positions, spring means arranged to act on two diametrically oppositely spaced portions of said non-rotatable brake elements for effecting movement thereof to their release positions, and diametrically oppositely disposed means arranged 90° from said spaced portions operative in the release position of one of said non-rotatable brake elements to position the adjacent portions of another of said non-rotatable brake elements in their release position.

31. A brake mechanism for a wheel and axle assembly of a railway vehicle truck comprising a pile of interleaved and axially movable rotatable and non-rotatable friction brake elements having release positions in which they are disengaged from each other and braking positions in frictional interengagement to effect braking of one of said wheels, means operatively connected to said brake elements to effect movement thereof from their release positions to their braking positions, spring means acting on said rotatable brake elements for moving same from their braking positions to their release positions, spring means arranged to act on two diametrically oppositely spaced portions of said non-rotatable brake elements for effecting movement thereof to their release positions, the brake element at one end of said pile being a non-rotatable brake element, a pair of diametrically oppositely disposed members secured to the end non-rotatable element substantially 90° from said spaced portions and extending over the peripheral surface of the adjacent non-rotatable element and provided over said surface with a one-way acting hook, and a pair of lugs projecting from said surface in alignment with the hooks of said members for engagement by said hooks upon said end non-rotatable element obtaining its release position to position the connected parts of the adjacent non-rotatable element in their release position.

JOSEPH C. McCUNE.
GEORGE K. NEWELL.